(12) United States Patent
Chen et al.

(10) Patent No.: US 12,229,243 B2
(45) Date of Patent: Feb. 18, 2025

(54) SYSTEMS AND METHODS FOR MANAGING BATTERIES

(71) Applicant: Gogoro Inc., Hong Kong (CN)

(72) Inventors: Ching Chen, Taipei (TW); Jia-Yang Wu, Taoyuan (TW); En-Yi Liao, Taipei (TW); Chien-Chung Chen, Taoyuan (TW); Hok-Sum Horace Luke, Mercer Island, WA (US)

(73) Assignee: GOGORO INC., Hong Kong (CN)

( * ) Notice: Subject to any disclaimer, the term of this patent is extended or adjusted under 35 U.S.C. 154(b) by 292 days.

(21) Appl. No.: 17/627,252

(22) PCT Filed: Jul. 15, 2020

(86) PCT No.: PCT/IB2020/000578
§ 371 (c)(1),
(2) Date: Jan. 14, 2022

(87) PCT Pub. No.: WO2021/009561
PCT Pub. Date: Jan. 21, 2021

(65) Prior Publication Data
US 2022/0245234 A1 Aug. 4, 2022

Related U.S. Application Data

(60) Provisional application No. 62/875,379, filed on Jul. 17, 2019.

(51) Int. Cl.
*G06F 21/44* (2013.01)
*B60L 53/65* (2019.01)
*B60L 53/80* (2019.01)

(52) U.S. Cl.
CPC ............. *G06F 21/44* (2013.01); *B60L 53/65* (2019.02); *B60L 53/80* (2019.02); *G06F 2221/2129* (2013.01)

(58) Field of Classification Search
CPC .............. G06F 16/955; G06F 21/44; G06F 2221/2129; G06F 2221/2141; B60L 53/80;
(Continued)

(56) References Cited

U.S. PATENT DOCUMENTS

| 10,293,699 B2* | 5/2019 | Zhao ...................... B60L 58/15 |
| 2012/0215413 A1* | 8/2012 | Kluka ................... B60W 50/00 |
| | | 701/1 |

(Continued)

FOREIGN PATENT DOCUMENTS

| CN | 107292507 A | 10/2017 |
| CN | 109080848 A | 12/2018 |

(Continued)

OTHER PUBLICATIONS

Office Action mailed Jun. 23, 2022 for Indian Patent Application No. 202117057103, 7 pages.

(Continued)

*Primary Examiner* — Ali S Abyaneh
*Assistant Examiner* — Brandon Binczak
(74) *Attorney, Agent, or Firm* — Perkins Coie LLP

(57) ABSTRACT

Method and associated system for managing and/or authenticating an energy storage device. The method includes receiving a first portion of identification information stored in a data storage attached to the energy storage device (401); analyzing the first portion of the identification information at least partially based on a device identification of the device (403); updating a second portion of the identification information stored in the data storage attached to the energy storage device based on a result of analyzing the first portion of the identification information (405).

27 Claims, 8 Drawing Sheets

(58) Field of Classification Search
CPC ...... B60L 53/65; B60L 2240/70; B60L 53/66; B60L 2240/72; B60L 53/53; B60L 53/60; B60L 53/67; B60L 58/10; B60L 53/00; H04W 4/70; H04W 12/06; Y02T 90/12; Y02T 10/62; Y04S 30/14

See application file for complete search history.

(56) References Cited

U.S. PATENT DOCUMENTS

| | | | |
|---|---|---|---|
| 2012/0240175 A1* | 9/2012 | Ohmori | H04N 21/6581 725/112 |
| 2014/0330855 A1* | 11/2014 | Atanasiu | G16H 30/20 707/769 |
| 2016/0068075 A1* | 3/2016 | Chen | B60L 53/65 320/107 |
| 2016/0117759 A1 | 4/2016 | Penilla et al. | |
| 2018/0281613 A1 | 10/2018 | Yu et al. | |
| 2019/0278352 A1* | 9/2019 | Lin | H02J 7/0068 |
| 2019/0389325 A1 | 12/2019 | Shiiyama et al. | |
| 2019/0389326 A1* | 12/2019 | Shiiyama | B60L 53/665 |
| 2020/0151784 A1* | 5/2020 | Kar | G06F 16/2379 |

FOREIGN PATENT DOCUMENTS

| | | | | |
|---|---|---|---|---|
| GB | 2053516 A | * | 2/1981 | ........... G05D 1/0234 |
| JP | 2014023036 A | * | 2/2014 | |
| JP | 2017529821 A | | 10/2017 | |
| JP | 2018160171 A | | 10/2018 | |
| KR | 20110060099 A | | 6/2011 | |
| KR | 20160050976 A | | 5/2016 | |
| WO | WO-2012001281 A1 | * | 1/2012 | ................ B60S 5/06 |
| WO | WO-2015001930 A1 | * | 1/2015 | .............. B60L 53/11 |
| WO | 2017197918 A1 | | 11/2017 | |

OTHER PUBLICATIONS

Office Action mailed Feb. 21, 2023 for Japanese Patent Application No. 2021-573265, 5 pages.

European Search Report mailed on Oct. 14, 2022 for European Patent Application No. 20840796.5; 6 pages.

Written Opinion mailed Oct. 15, 2024 in Singapore App. 11202113620P, 10 pp.

* cited by examiner

SYSTEMS AND METHODS FOR MANAGING BATTERIES

CROSS-REFERENCE TO RELATED APPLICATION(S)

This application is a 35 U.S.C. § 371 U.S. National Phase application of International Patent Application No. PCT/IB2020/000578, filed Jul. 15, 2020, and titled SYSTEMS AND METHODS FOR MANAGING BATTERIES, which claims priority to U.S. Provisional Application No. 62/875,379, filed on Jul. 17, 2019, the disclosures of which are hereby incorporated by reference in their entireties.

TECHNICAL FIELD

The present technology is directed to systems and methods for managing exchangeable energy storage devices. More particularly, the present technology is directed to systems and methods for enabling multiple energy-storage-exchange stations to operate in various operational modes.

BACKGROUND

Some electric vehicles are powered by exchangeable batteries. When a user brings a depleted battery to a battery-exchange station for exchange, before providing a sufficiently-charged battery to the user, it is important for the station to make sure that the sufficiently-charged battery is to be used in an authorized vehicle. However, under certain circumstances, when the station provides the sufficiently-charged battery, the station cannot verify whether the vehicle that to be powered by the sufficiently-charged battery is authorized or not. For example, there can be a plurality of vehicles under a vehicle-sharing program. The vehicle sharing program enables a user to pick up a vehicle at one location, and then leave the vehicle, with a depleted battery, at a random location. Under such circumstances, a service crew (or an authorized person) may need to pick up a few sufficiently-charged batteries from various battery-exchange stations (e.g., for vehicles to be shared with depleted batteries) without knowing which vehicles are going to be powered by these sufficiently-charged batteries. Therefore, it is challenging to implement desirable security mechanisms for the batteries. As a result, it is advantageous to have an improved system and method to address the foregoing issues.

BRIEF DESCRIPTION OF THE DRAWINGS

Embodiments of the disclosed technology will be described and explained through the use of the accompanying drawings.

Figure 1:
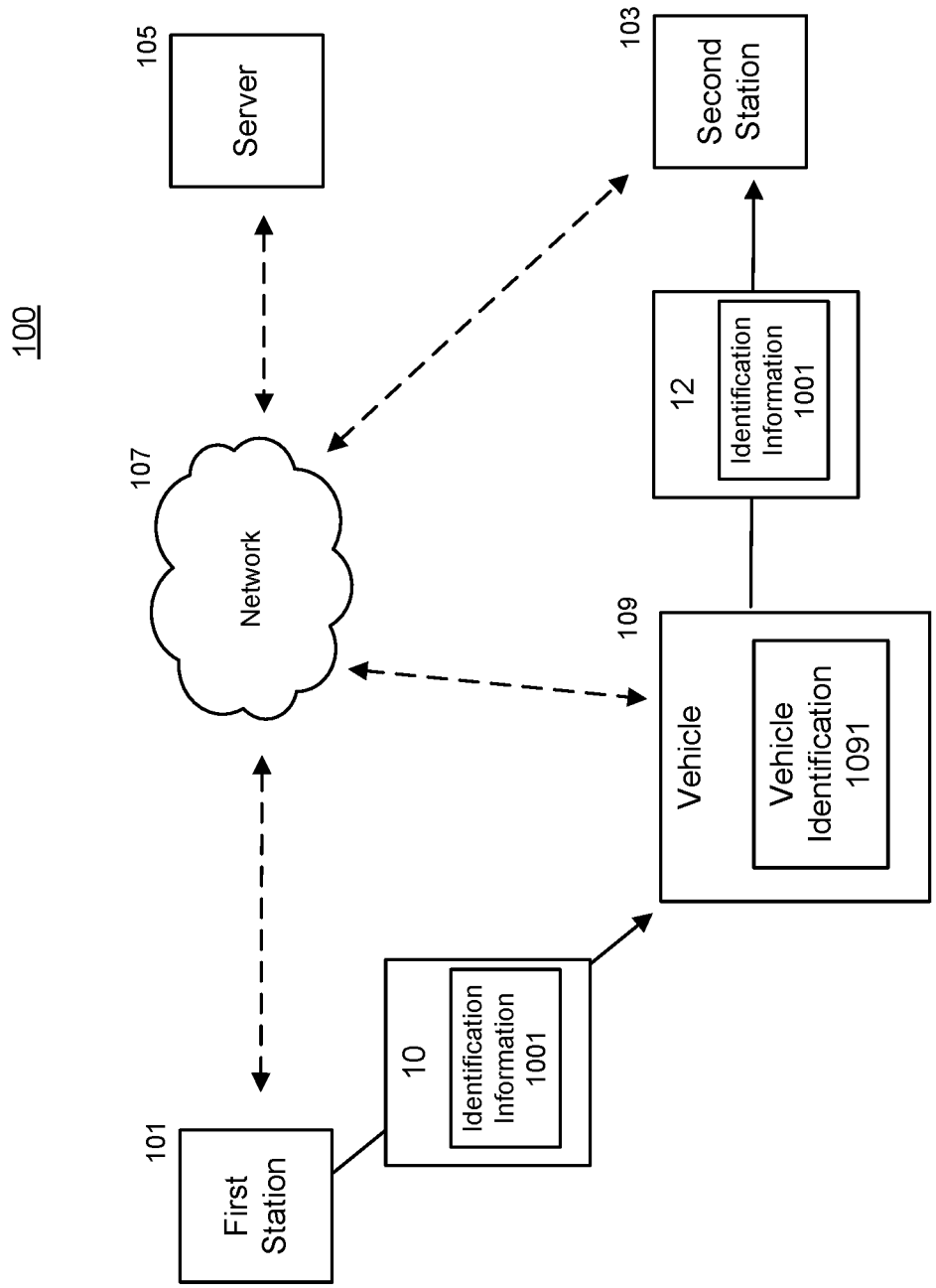
FIG. 1 is a schematic diagram illustrating a system in accordance with embodiments of the disclosed technology.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "some embodiments," "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The present disclosure relates to methods and systems for managing energy storage devices such as batteries, ultra-capacitors, super-capacitors, etc. The energy storage device can be coupled to a data storage (e.g., a memory, a flush drive, etc.), and the data storage stores identification information corresponding to the energy storage device.

The identification information is used to identify and/or authenticate an authorized vehicle (or device) that the energy storage device is authorized to provide power to. For example, the identification information of the energy storage device is verified or authenticated prior to enabling the same to provide power to the authorized vehicle. The verification or authentication can be done by a processor of the vehicle, a portable device of a user, or a controller attached to the energy storage device.

The energy storage device can be stored in and charged by a station for exchange. For example, a user can go to the station and exchange a depleted energy storage device for a sufficiently-charged one. After receiving the depleted energy storage device, the station uses the identification information of the depleted energy storage device to identify the user who brings it the station and verify that the vehicle that has been powered by the depleted energy storage device is an authorized one. Before providing the sufficiently-charged energy storage device to the user, the station copies the identification information of the depleted energy storage device to the sufficiently-charged energy storage device. In the forging example, the station operates under a "normal" mode (or first operational mode). In an area of service (e.g., a city, a neighborhood, a district, etc.), there are multiple stations in operation.

Under certain circumstances, the station can be asked to provide a sufficiently-charged energy storage device without first receiving a depleted energy storage device. For example, a vehicle sharing or rental plan can allow vehicles to be picked up or dropped at random locations. In such cases, there is a need to make sure that the energy storage devices in the randomly-dropped vehicles have sufficient power for the upcoming users to use. For example, a "milk run" can be scheduled for a service crew to pick up one or more sufficiently-charged energy storage devices at one or more stations, and then deliver the same to the randomly-dropped vehicles for exchange. In such cases, when the service crew picks up the sufficiently-charged energy storage devices at the stations, the present technology enables the stations to operate under a "milk run" mode, which allows the stations to provide sufficiently-charged energy storage devices without writing the identification information from inserted energy storage devices to these sufficiently-charged energy storage devices (which is required during the "normal" mode).

By this arrangement, the present technology enables multiple stations to be operated under either "normal" mode or "milk run" mode at the same time. Advantages include that the multiple stations can provide service to users with various energy subscription plans (e.g., a personal plan, a family plan, a corporate plan, a vehicle-sharing plan, a vehicle-rental plan, etc.).

In some embodiments, the identification information can be a chunk of character/number string (e.g., x123y456z789, &98%76$21, etc.). In such embodiments, the identification information can be identified as a whole. In some embodiments, the identification information can include more than one portions. For example, the identification information can include a first portion to indicate a group that the authorized vehicle belongs to. For example, the first portion can be a "prefix" or "ABC" indicating that the group is "ABC" vehicle-sharing fleet. The identification information can include a second portion to specify the particularly authorized vehicle. For example, the second portion can be "123456" which is a "unique serial number" for the authorized vehicle. As another example, the second portion can be a "universal identifier" such as "000000" or "888888," temporarily filled for a group of authorized vehicles. In another example, the second portion can be "null" or an empty space. By using both the first and second portions of the identification information, the present technology enables effective, secure management of multiple energy storage devices among multiple stations operating in various modes.

FIG. 1 is a schematic diagram illustrating a system 100 in accordance with embodiments of the disclosed technology. The system 100 includes a first station 101, a second station 103, and a server 105. The first station 101 and second station 103 can communicate with the server 105 via a network 107. The first and second stations 101, 103 are configured to receive, charge, and provide multiple energy storage devices for exchange. The energy storage devices can be used to power authorized vehicles such as vehicle 109. The first station 101 can operate in a first operational mode (e.g., "normal" mode) or a second operational mode (e.g., "milk rune" mode). In different operational modes, the first station 101 manages the energy storage devices to be provided in different ways.

When the first station 101 operates in the first operational mode, a user can go to the station to exchange a depleted energy storage device for a sufficiently-charged one. After receiving the depleted energy storage device, the first station 101 copies the identification information of the depleted energy storage device to the sufficiently-charged energy storage device.

When the first station 101 operates in the second operational mode, a sufficiently-charged energy storage device 10 can be removed from the first station 101 without adding identification information of a depleted energy storage device. Instead, a "prefix" or "first portion" is added in the sufficiently-charged energy storage device 10. Embodiments of the "prefix" or "first portion" are discussed in detail below. The sufficiently-charged energy storage device 10 can then be delivered to the vehicle 109 to power the same. After the sufficiently-charged energy storage device 10 becomes a depleted energy storage device 12, it can be used to exchange another energy storage device (e.g., at the second station 103). The system 100 includes a security mechanism to manage the energy storage devices in the system 100. The security mechanism can be implemented by the first station 101 and the vehicle 109. In some embodiments, the server 105 can also facilitate implementing the security mechanism.

First, at the station side, the first station 101 implements the security mechanism to make sure that the sufficiently-charged energy storage device 10 removed from the first station 101 can only be used to power the authorized vehicle 109. Second, at the vehicle side, the security mechanism includes only enabling power to be drawn from the sufficiently-charged energy storage device 10 unless certain criteria are met, such as a match between identification information 1001 from the energy storage device 10 and vehicle information 1091 from the vehicle 109. In some embodiments, the identification information 1001 is called a "subscription ID at the battery side," whereas the vehicle information 1091 is called a "subscription ID" at the vehicle side." Details of the security mechanism with respect to operational modes are discussed below.

(A) First Operational or "Normal" Mode (i) First Station Side Security Mechanism When the first station 101 is operating under the first operational mode or the "normal" mode, a user first inserts a depleted energy storage device to the first station 101 to exchange the sufficiently-charged energy storage device 10. The first station 101 then reads the identification information from (the data storage coupled to) the inserted, depleted energy storage device and stores that as identification information 1001 in (the data storage coupled to) the sufficiently-charged energy storage device 10 to be provided to the user. In such embodiments, the first station 101 copies the whole identification information from the inserted, depleted energy storage device and stores it to the sufficiently-charged energy storage device 10 to be provided.

(ii) Vehicle Side Security Mechanism

When the user later inserts the sufficiently-charged energy storage device 10 in the vehicle 109, a processor (e.g., an engine control unit, ECU) of the vehicle 109 verifies whether the identification information 1001 of the sufficiently-charged energy storage device 10 matches the vehicle identification 1091 of the vehicle 109. If so, the processor then permits the sufficiently-charged energy storage device 10 to provide power to the vehicle 109. If not, the processor can instruct the sufficiently-charged energy storage device 10 not to provide power and/or send a notice or an alarm to the server 105, a portable device (e.g., a smartphone of the user associated with the vehicle 109), and/or other recipients predetermined by an operator of the system 100.

(iii) Second Station Side Security Mechanism

After the sufficiently-charged energy storage device 10 becomes a depleted or non-sufficiently-charged energy storage device 12, it can be brought to the second station 103 (which operates in the normal mode) for an exchange. When the depleted energy storage device 12 is inserted in the second station 103, the second station 103 checks the identification information 1001 and verifies whether the identification information 1001 matches the vehicle identification 1091 of the vehicle 109. If so, the second station 103 accepts the depleted energy storage device 12 and approves the exchange. If not, the second station 103 rejects the exchange and can send a notice or an alarm to the server 105, a portable device, and/or other recipients predetermined by the operator of the system 100.

(B) Second Operational or "Milk-Run" Mode
(i) First Station Side Security Mechanism When the first station 101 is operating under the second operational mode or a "milk-run" mode, the first station 101 allows an authorized person to acquire the sufficiently-charged energy storage device 10 without first inserting one (e.g., depleted or not sufficiently-charged) energy storage device. The authorized person can be, for example, a service crew, a person who needs to acquire a sufficiently-charged battery to "save" a vehicle with a depleted battery, a battery deliver service provider, etc.

In such embodiments, the authorized person can first communicate with the first station 101 and request for the sufficiently-charged energy storage device 10 (e.g., asking for a battery with more than 50%, 90%, or 98% State of Charge, SoC). For example, the authorized person can communicate with the first station 101 by a user interface (e.g., a touchscreen display, a panel, a keypad, other suitable input devices, etc.), via a portable device, and/or via the server 105. In some examples, the authorized person can make a reservation for the sufficiently-charged energy storage device 10 prior to be physically at the first station 101.

Upon receiving the request and verify the identity of the authorized person, the first station 101 identifies the sufficiently-charged energy storage device 10 therein and then adjusts the identification information 1001 in (the data storage coupled to) the sufficiently-charged energy storage device 10.

More particularly, the first station 10 can set the first portion of the identification information 1001 as prefix "ABC," which is indicative of that the sufficiently-charged energy storage device 10 can be used to power any vehicle belonging to group "ABC" (e.g., vehicles associated with "ABC" vehicle-sharing group). In some implementations, the first station 101 can put a universal identifier (e.g., "000000," "888888," or "XXXXXX") in the second portion of the identification information. In some embodiments, the first station 101 can let the second portion be "null" or leave it empty. When the identification information 1001 of the sufficiently-charged energy storage device 10 is set, the authorized person can then remove the sufficiently-charged energy storage device 10 from the first station 101. In some implementations, the authorized person can request more than one energy storage device at a time.

(ii) Vehicle Side Security Mechanism

When the authorized user later inserts the sufficiently-charged energy storage device 10 in the vehicle 109, the processor of the vehicle 109 can first verify whether the first portion (e.g., prefix or "ABC") of the identification information 1001 of the sufficiently-charged energy storage device 10 matches the first portion of the vehicle identification 1091 of the vehicle 109. If so, the processor then permits the sufficiently-charged energy storage device 10 to provide power to the vehicle 109.

Further, the processor of the vehicle 109 stores the second portion (e.g., a unique serial number of a vehicle, such as "123456) of the vehicle identification 1091 in the second portion of the identification information 1001 of the sufficiently-charged energy storage device 10. By this arrangement, the sufficiently-charged energy storage device 10 can be later exchanged in a station (e.g., the second station 103) operating in the normal mode.

If the first portion of the identification information 1001 of the sufficiently-charged energy storage device 10 does not match the first portion of the vehicle identification 1091 of the vehicle 109, the processor can instruct the sufficiently-charged energy storage device 10 not to provide power and/or send a notice or an alarm to the server 105, a portable device (e.g., a smartphone of the user associated with the vehicle 109), and/or other suitable recipients.

(iii) Second Station Side Security Mechanism

After the sufficiently-charged energy storage device 10 becomes the depleted or non-sufficiently-charged energy storage device 12, it can be brought to the second station 103 (which operates in the first operational mode) for an exchange. When the depleted energy storage device 12 is inserted in the second station 103, the second station 103 checks the identification information 1001 and verifies whether the second portion of the identification information 1001 has been updated by the vehicle 109. If so, the second station 103 accepts the depleted energy storage device 12 and approves the exchange. If not, the second station 103 rejects the exchange and can send a notice or an alarm to the server 105, a portable device, and/or other recipients predetermined by the operator of the system 100.

The foregoing arrangement enables multiple energy-storage-exchange stations to be operated under the first operational and second operational modes in the same time. It is advantageous because some of the multiple energy-storage-exchange stations can be switched from the "normal" mode to the "milk-run" mode when necessary, without interrupting the rest of the stations (which continue to operate under the "normal" mode).

For example, a battery-delivery-service crew needs to replace four depleted batteries for two electric vehicles (e.g., belong to "ABC" company) at various locations in Area X. Depending on availability (and/or other factors such as battery demand, exchange price, etc.), the crew can pick up two sufficiently-charged batteries at station X1 and two sufficiently-charged ones at station X2. When the crew picks up the batteries, the operational modes of stations X1 and X2 are switched from the normal mode to the milk-run mode based on the request sent by the crew. After the pick-up, the operational modes of stations X1 and X2 are switched back to the normal mode. The crew can then start a "milk run" to deliver these batteries. As a result, the "milk run" does not substantially interrupt normal battery exchange activities at stations X1 and X2. In some embodiments, there can be multiple "milk runs" performed at the same time.

In some embodiments, the server 105 can communicate with the first and second stations 101, 103 and/or the vehicle 109 to facilitate the security mechanism or authentication processes. For example, the server 105 can verify the identity of the person who attempts to remove the sufficiently-charged energy storage device 10 from the first station 101 under the "milk-run" mode (e.g., verifying the identity based on the information included in the request sent from the person). In another embodiment, the server 105 can communicate with the vehicle 109 and the second station 103 to verify that the depleted energy storage device 12 has been inserted in the vehicle 10. The server 105 can also help verify that the identification information 1001 of the depleted energy storage device 12 has been updated by the vehicle 109.

Figure 2:
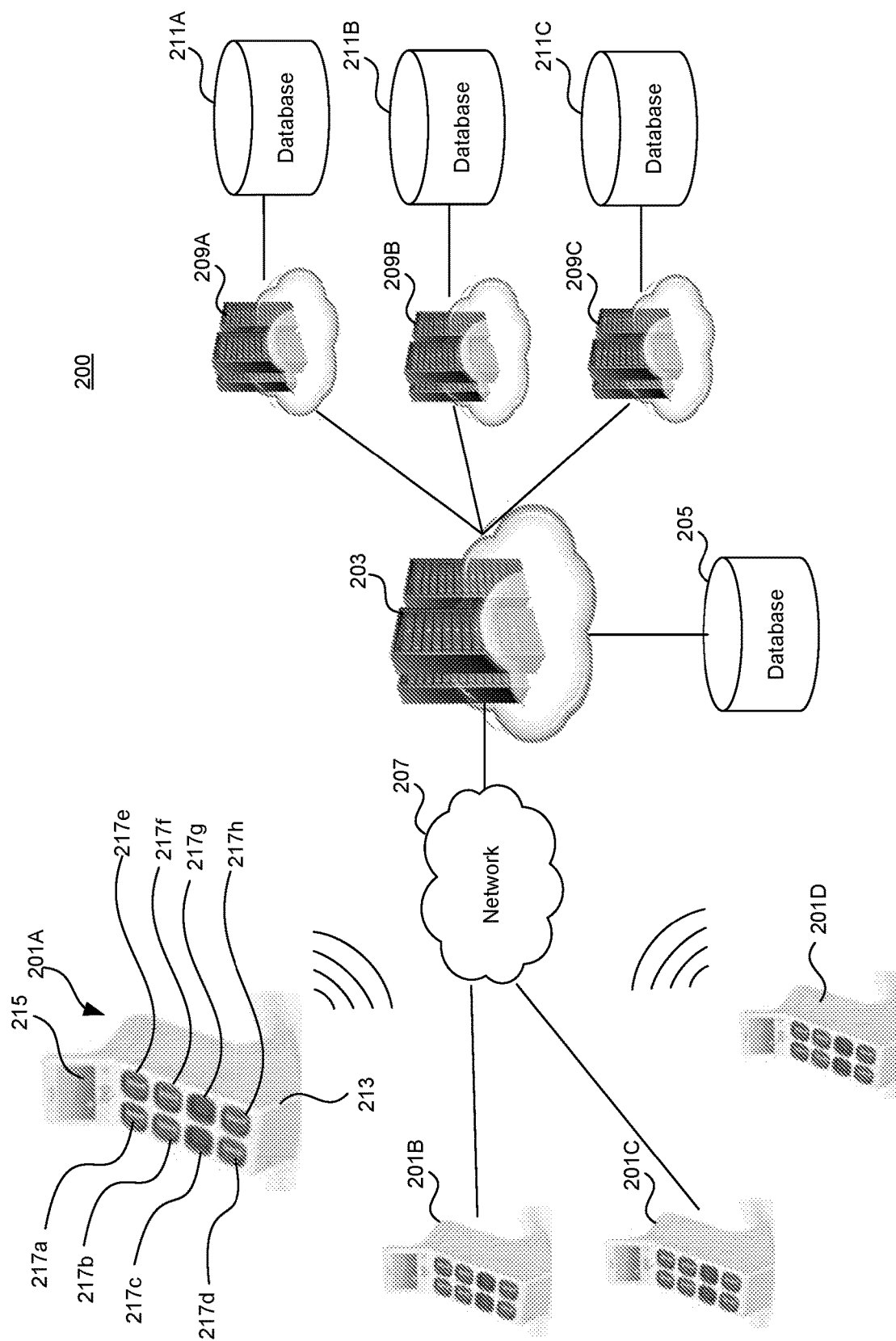
FIG. 2 is a schematic diagram illustrating a system in accordance with embodiments of the disclosed technology.

FIG. 2 is a schematic diagram illustrating a system 200 in accordance with embodiments of the disclosed technology. As shown, the system 200 includes one or more battery exchange stations 201A-D, a main server 203, a database 205, and a network 207. As shown, the battery exchange stations 201A, 201D are wirelessly coupled to the main server 203 via the network 207. The battery exchange stations 201B, 201C are coupled to the main server 203 via the network 207 via wired connections. The main server 203 is further coupled to the database 205, which can store information for managing batteries in the system 200. The information for managing batteries can include, for example, battery identification information (e.g., the identification information 1001) and vehicle identification (e.g., the vehicle identification 1091) discussed herein.

Using the battery exchange station 201A as an example, in the illustrated embodiment, the station 201A can include a battery exchange rack 213 and a user interface 215 (e.g., a display) positioned thereon. As shown, the battery exchange rack 213 can include eight battery slots 217a-h to accommodate batteries. During operation, there are only six battery slots (e.g., slots 217a, 217b, 217d, 217e, 217f, and 217h) are occupied by batteries, and the rest two slots (e.g., slots 217c and 217g) are reserved for a user to insert batteries to be exchanged (e.g., depleted, low power batteries). In some embodiments, the battery exchange stations 201A-D can have different arrangements such as different numbers of racks, displays, and/or slots. In some embodiments, the battery exchange stations 201A-D can include modular components (e.g., modular racks, modular displays, etc.) that enable an operator to conveniently install or expand the battery exchange stations 201A-D. The battery exchange stations 201A-D can be electrically coupled to one or more power sources (e.g., power grid, power lines, power storage, power station/substations, etc.) to receive electric power to charge the batteries positioned therein and to perform other operations (e.g., to communicate with the main server 203).

In some embodiments, the station 201A allows a user to remove or insert a particular number of batteries (e.g., two) in one transaction. In other embodiments, however, the station 201A can allow a user to remove or insert other numbers (e.g., one, three, four, etc.) of batteries in one transaction. In some embodiments, the station 201 can have a locking mechanism for securing the batteries positioned therein. In some embodiments, the station 201 can be implemented without the locking mechanism.

In some embodiments, the main server 203 can be an edge server that receives client requests and coordinates fulfillment of those requests through other servers, such as servers 209A-C. The servers 209A-C are further coupled to databases 211A-C. Although each of the main server 203 and the servers 209A-C is displayed logically as a single server, these servers can each be a distributed computing environment encompassing multiple computing devices located at the same or at geographically disparate physical locations.

In some embodiments, the main server 203 and the servers 209A-C can each act as a server or client to other server/client devices. As shown, the main server 203 connects to the database 205. The servers 209A-C can each connect to one of the databases 211A-C. As discussed above, each of the main server 203 and the servers 211A-C can correspond to a group of servers, and each of these servers can share a database or can have its own database.

The databases 205, 211A-C can store information associated with the present disclosure (e.g., battery identification information, vehicle/device identification collected by the main server 203, information analyzed by the main server 203, information generated by the main server 203, user account information, user battery plans, user histories, user behavior, user habits, user preferences, etc.). In some embodiments, at least one of the databases 211A-C can be publicly accessible databases (e.g., weather forecast database, travel alert database, traffic information database, location service database, map database, etc.) maintained by government or private entities. In some embodiments, at least one of the databases 211A-C can be private databases that provide proprietary information (e.g., user account, user credit history, user subscription information, etc.). In some embodiments, the servers 209A-C and/or the databases 211A-C are operated by a cloud service provider, and the main server 203 and/or the database 205 are operated by a battery service provider (e.g., who offers a user multiple battery exchange plans).

The network 207 can be a local area network (LAN) or a wide area network (WAN), but it can also be other wired or wireless networks. The network 207 can be the Internet or some other public or private network. The battery exchange stations 201A-D can be connected to the network 207 through a network interface, such as by wired or wireless communication. While the connections between the main server 203 and the servers 209A-C are shown as separate connections, these connections can be any kind of local, wide area, wired, or wireless network, including the network 207 or a separate public or private network. In some embodiments, the network 207 includes a secured network that is used by a private entity (e.g., a company, etc.).

Figure 3A:
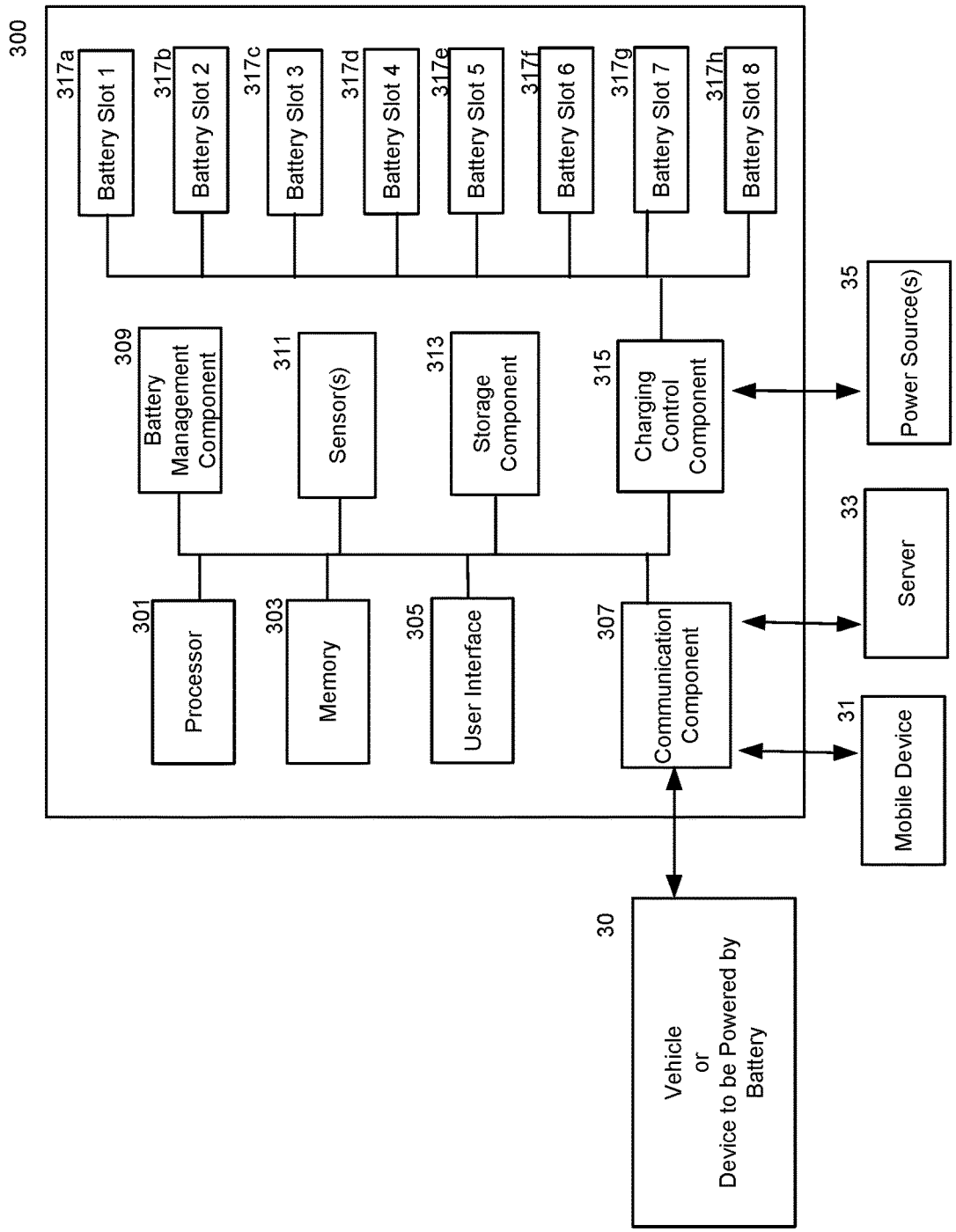
FIG. 3A is a schematic diagram illustrating a station in accordance with embodiments of the disclosed technology.

FIG. 3A is a schematic diagram illustrating a station 300 in accordance with embodiments of the disclosed technology. As shown, the station 300 includes a processor 301, a memory 303, a user interface 305, a communication component 307, a battery management component 309, one or more sensors 311, a storage component 313, and a charging component 315 coupled to eight battery slots 317a-h. The processor 301 is configured to interact with the memory 303 and other components (e.g., components 305-317) in the station 300. The memory 303 is coupled to the processor 301 and is configured to store instructions for controlling other components or other information in the station 300.

The user interface 305 is configured to interact with a user (e.g., receiving a user input and presenting information to the user). In some embodiments, the user interface 305 can be implemented as a touchscreen display. In other embodiments, the user interface 305 can include other suitable user interface devices (such as a keyboard/keypad with a display). The storage component 313 is configured to store, temporarily or permanently, information, data, files, or signals associated with the station system 300 (e.g., information measured by the sensors 313, information collected by the battery slots 317a-h, charging instructions; user information, etc.). The communication component 307 is configured to communicate with other devices (e.g., a vehicle or device to be powered by a battery, a server 33, other stations, a mobile device 31 carried by a user or a service crew, etc.).

The battery management component 309 is configured to manage and control the batteries positioned in the battery slots 317a-h. The battery management component 309 can implement a battery security mechanism (e.g., the security mechanism discussed above with reference to FIG. 1) for the batteries positioned therein. In some embodiments, the battery management component 309 can manage the batteries based on predetermined instructions or guidance stored in the station 300 (e.g., in the storage component 313). In some embodiments, the battery management component 309 can periodically communicate with the server 33 to request update instructions.

In some embodiments, the battery management component 309 can also be configured to collect information regarding the batteries positioned in the battery slots 317a-h, information regarding the station 300, information regarding one or more power sources 35, information regarding a user (e.g., received from the mobile device 31 via the communication component 307), and/or information regarding the vehicle 30. The battery management component 309 can transmit or upload the collected information to the server 33 for further analysis or process.

The sensors 311 are configured to measure information associated with the station 300 (e.g., working temperature, environmental conditions, power connection, network connection, etc.). The sensors 311 can also be configured to monitor the batteries positioned in the battery slots 317a-h. The measured information can be sent to the battery management component 309 and the server 33 for further analysis.

The charging component 315 is configured to control a charging process for each of the batteries positioned in the battery slots 317a-h. In some embodiments, the station 300 can include other numbers of battery slots. The battery slots 317a-h are configured to accommodate and charge the batteries positioned and/or locked therein. The charging component 315 receives power from the power sources 35 and then uses the power to charge the batteries positioned in the battery slots 317a-h.

In some embodiments, when the user positions a battery in one of the battery slots 317a-h, the station 300 can detect the existence of that battery and pull information therefrom. For example, the battery management component 309 can pull information associated with that battery (e.g., identification information of the battery, battery usage history, charging cycles, full charge capacity, vehicle information of the vehicles that the battery has provided power to or been associated with, user activities that the battery has been involved, etc.) from a battery memory inside, or coupled to, the battery.

Figure 3B:
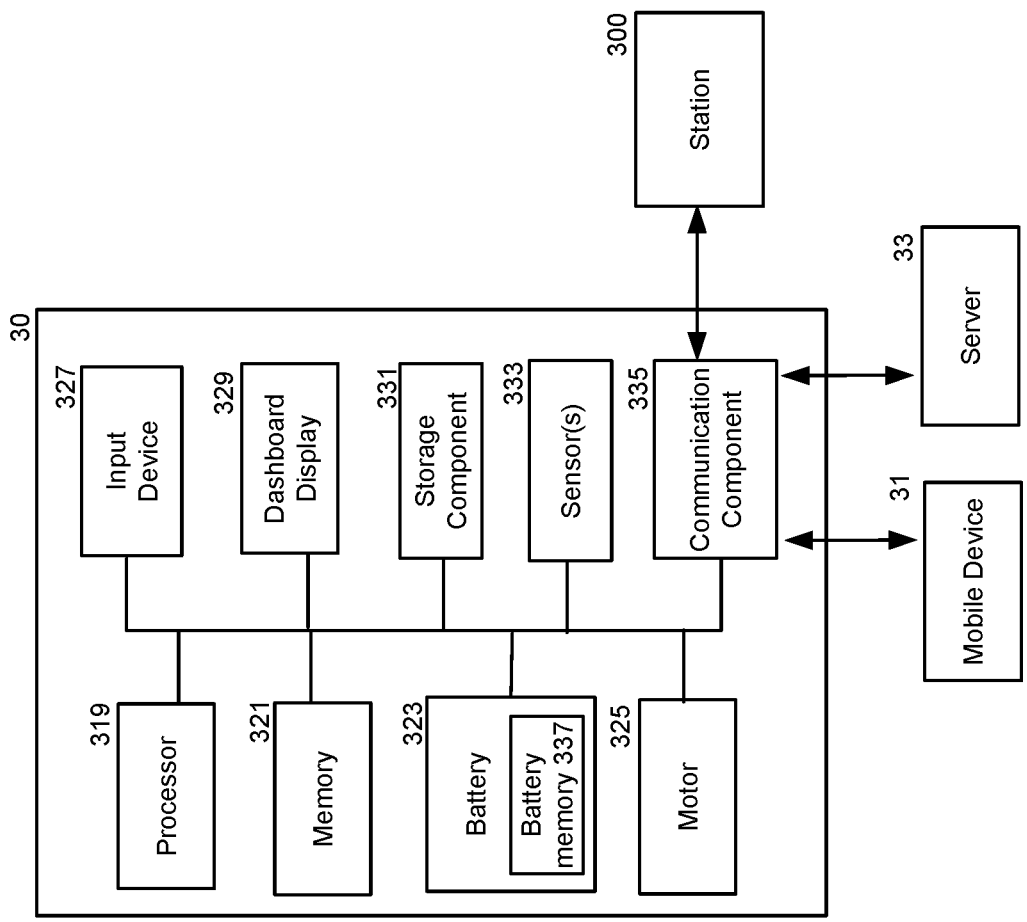
FIG. 3B is a schematic diagram illustrating a vehicle in accordance with embodiments of the disclosed technology.

FIG. 3B is a schematic diagram illustrating a vehicle 30 in accordance with embodiments of the disclosed technology. The vehicle 30 can be implemented as an electric scooter, an electric car, etc. The vehicle 30 includes a processor 319, a memory 321, a battery 323, a motor 325, an input device 327, a dashboard display 329, a storage component 331, one or more sensors 333, and a communication component 335. The processor 319 is configured to interact with the memory 321 and other components (e.g., components 323-335) in the vehicle 30. The memory 321 is coupled to the processor 319 and is configured to store instructions for controlling other components or other information in the vehicle 30. The storage component 331 can have similar functions as the storage component 313 or 207. The communication component 335 can have similar functions as the communication component 307 or storage component 313 or 221. The dashboard display 329 is configured to visually present information to a user (e.g., information associated with the vehicle 30).

The battery 323 is configured to power the motor 325 such that the motor 325 can move the vehicle 30. The battery 323 can be an exchangeable battery. When the battery 323 is running out of power, a user of the vehicle 30 can exchange or swap the battery 323 at the station system 300. For example, the user can remove the battery 323 from the vehicle system 30 and then position the battery 323 in one of the battery slots 317a-h (e.g., an empty one without a battery positioned therein). The user can then take a sufficiently- or fully-charged battery in the battery slots 317a-h and then install it in the vehicle system 30. In some embodiments, the user can request a sufficiently- or fully-charged battery to be delivered to the vehicle 30 (see e.g., embodiments where the station operates in the "milk-run" mode). The battery 323 includes a battery memory 337 to store battery-related information (e.g., the identification information 1001).

Figure 4:
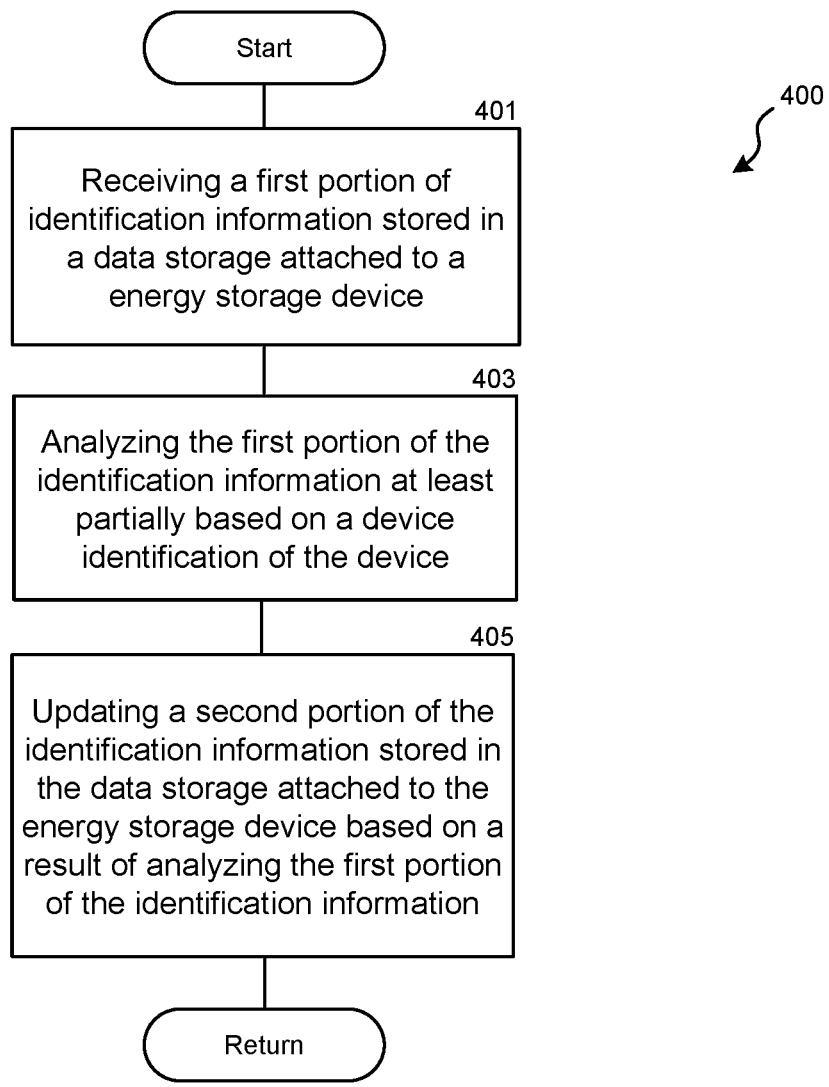
FIGS. 4-7 are flowcharts illustrating methods in accordance with embodiments of the disclosed technology.

FIG. 4 is a flowchart illustrating a method 400 in accordance with embodiments of the disclosed technology. The method 400 is configured to for authenticate an energy storage device. The method 400 can be implemented by a vehicle (e.g., vehicle 109 or 30) or a device to be powered by the energy storage device (e.g., a portable, smaller-sized battery exchange station, a portable kiosk, etc.). The method 400 starts at block 401 by receiving a first portion of identification information stored in a data storage attached to the energy storage device. The energy storage device is configured to power the vehicle or the device. In some embodiments, the data storage can be positioned in a housing of the energy storage device and controlled by a controller of the energy storage device.

In some embodiments, the first portion can be indicative of a group of devices or vehicles that the device/vehicle belongs to. For example, the first portion can be a "prefix" or "CORP-K" indicating that the group is company K's vehicle-sharing fleet. The identification information can include a second portion to specify the particular authorized vehicle. For example, the second portion can be "435678922" which is a "unique serial number" for the authorized vehicle. As another example, the second portion can be a "universal identifier" such as "000000000" or "#########." In another example, the second portion can be "null" or an empty space At block 403, the method 400 continues by analyzing the first portion of the identification information at least partially based on a vehicle identification/device identification of the vehicle/device. In some embodiments where the energy storage device is a battery, the "device identification" or "vehicle identification" can be a counterpart of the "identification information" at the device/vehicle side. The device identification can also include first and second portions corresponding to those of the identification information at the battery side. In such embodiments, analyzing the first portion of the identification information includes comparing it with the first portion of the device information to see if they match.

At block 405, the method 400 continues by updating a second portion of the identification information stored in the data storage attached to the energy storage device based on a result of analyzing the first portion of the identification information. For example, if the result of the analysis shows a "match" between the first portions at the battery side and the device/vehicle side, it shows that the energy storage device is authorized to power the device/vehicle. In other words, the device/vehicle and the energy storage device are both authenticated. The process can then move forward to update the second portion of the identification information (e.g., at battery side), such that the energy storage device can be exchanged at a station operating under a "normal" mode (see e.g., the second station 103 in FIG. 1).

Without updating the second portion of the identification information, the energy storage device cannot be used to exchange another energy storage device and/or be charged in a station operating under the "normal" mode. In such embodiments, the energy storage devices without updated second portions can be brought to either (i) authorized vehicles/devices, or (ii) a station operating under a "milk-run" mode.

If the analysis shows a "no match," then the energy storage device is not authorized to power the device/vehicle. An alarm or a notice can be generated to address this issue.

Steps 401, 403, and 405 are steps performed at the vehicle/device side. In some embodiments, before Steps 401, 403, and 405, the energy storage device can be prepared and conditioned by a first energy-storage-exchange station (e.g., the first station 101 in FIG. 1). In response to a request (e.g., asking for a 90% charged battery for a vehicle in vehicle sharing group "ABC"), the first station can update the identification information stored in the data storage attached to the energy storage device. For example, the first station can write "ABC" in the first portion of the identification information and write "000000" (i.e., a universal identifier) in the second portion of the identification information of the energy storage device. In some embodiments, the second portion of the identification information can be erased or set as "null" or an empty space. By this arrangement, the energy storage device is set to be used for any device/vehicle in vehicle sharing group "ABC."

In some embodiments, the request can be sent from a portable device associated with the vehicle/device to be powered. For example, an operator of the vehicle/device can send the request from his or her smartphone.

In some embodiments, the request can be manually entered at the first station via a user input. For example, a service crew can input the request (e.g., asking for three batteries with more than 95% SoC) before starting a "milk run" (e.g., delivering batteries to multiple vehicles/devices that belong to one or more groups).

In some embodiments, the request can be sent from the vehicle/device. For example, if a processor of the vehicle detects that its current battery is low and determines that it will not be able to make it to a nearby station for exchange, the processor can initiate a process of sending such requests to a station or a server. In some embodiments, the server can coordinate with multiple stations to prioritize and respond to such requests.

Figure 5:
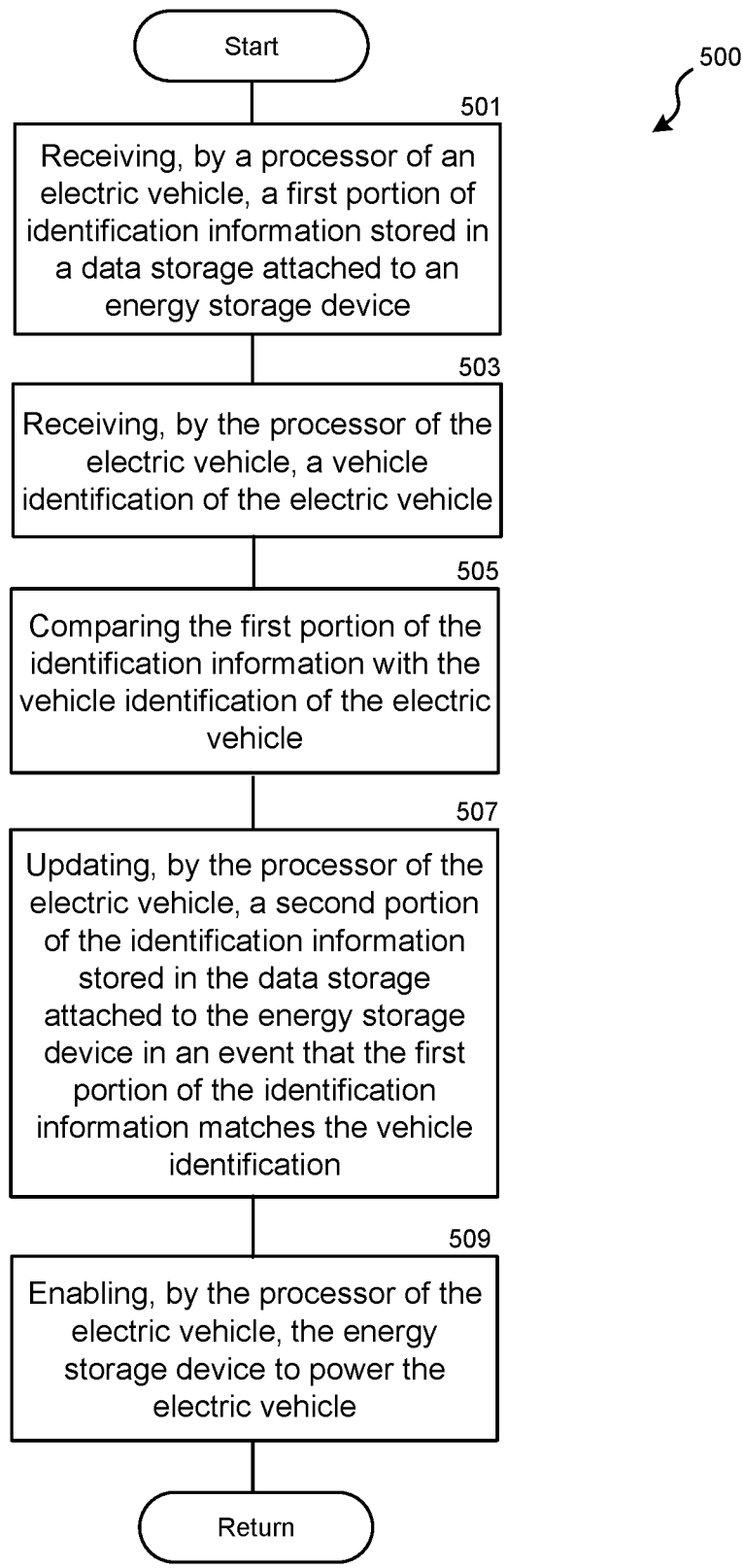

FIG. 5 is a flowchart illustrating a method 500 in accordance with embodiments of the disclosed technology. The method 500 is for operating an electric vehicle powered by an energy storage device. The method 500 starts at block 501 by receiving, by a processor of the electric vehicle, a first portion of identification information stored in a data storage attached to the energy storage device.

At block 503, the method 500 continues by receiving, by the processor of the electric vehicle, a vehicle identification of the electric vehicle. In some embodiments, the vehicle identification can be stored in a storage component in the vehicle/device (e.g., the storage component 331 in FIG. 3B) or from a server (e.g., the server 33 in FIG. 3B).

At block 505, the method 500 incudes comparing the first portion of the identification information with the vehicle identification of the electric vehicle. The first portion of the identification information can include a prefix. The prefix can correspond to a group of electric vehicles which the electric vehicle belongs to.

At block 507, the method 500 continues by updating, by the processor of the electric vehicle, a second portion of the identification information stored in the data storage attached to the energy storage device in an event that the first portion of the identification information matches the vehicle identification. At block 509, the method 500 incudes enabling, by the processor of the electric vehicle, the energy storage device to power the electric vehicle. Updating the second portion of the identification information can include updating a unique serial number corresponding to the vehicle identification of the electric vehicle.

In some embodiments, the method further includes transmitting a signal to a server in an event that the first portion of the identification information does not match the vehicle identification.

Figure 6:
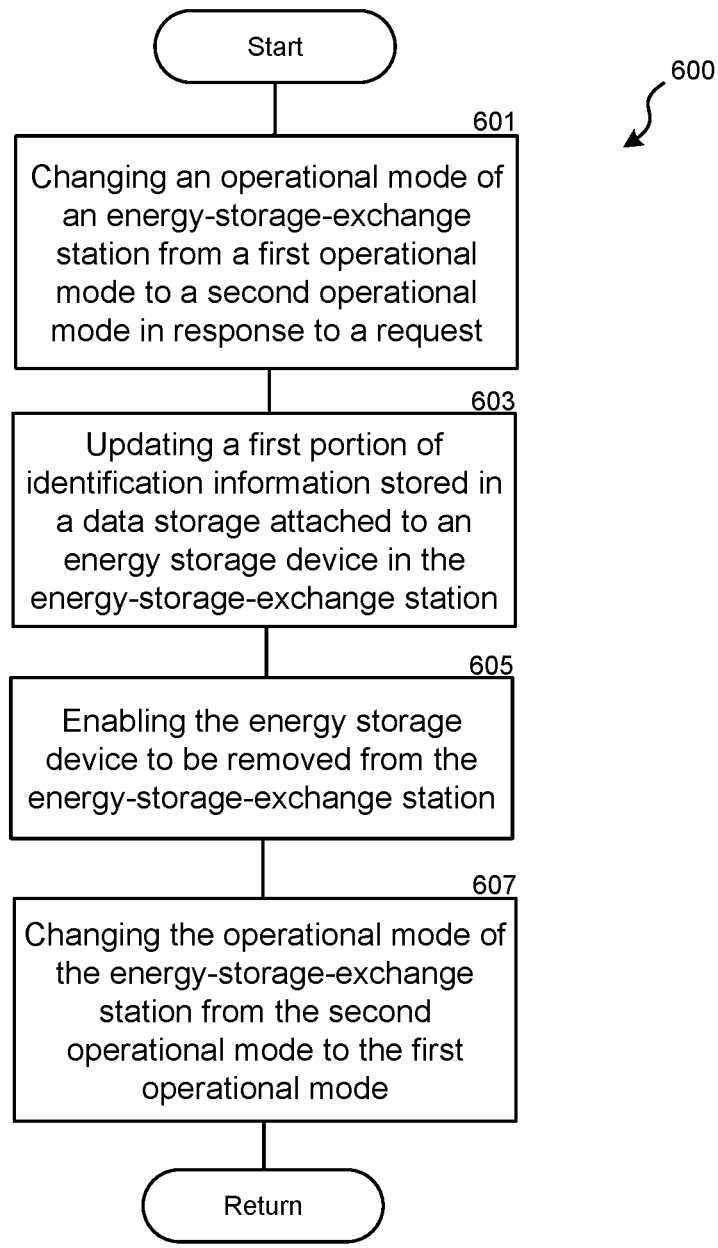

FIG. 6 is a flowchart illustrating a method 600 in accordance with embodiments of the disclosed technology. The method 600 is for operating an energy-storage-exchange station. The method 600 starts at block 601 by changing, by a processor of the energy-storage-exchange station, an operational mode of the energy-storage-exchange station from a first operational mode to a second operational mode in response to a request.

At block 603, the method 600 continues by updating, by the processor of the energy-storage-exchange station, a first portion of identification information stored in a data storage attached to an energy storage device in the energy-storage-exchange station. The first portion of the identification information corresponds to a device identification of a device (e.g., indicative of a group of devices which the device belongs to, such as a fleet of vehicles). The energy storage device is configured to power the device.

At block 605, the method 600 incudes enabling the energy storage device to be removed from the energy-storage-exchange station. In some embodiments, at block 607, the method 600 can continue by changing the operational mode of the energy-storage-exchange station from the second operational mode to the first operational mode.

The method 600 can further include updating by the processor of the energy-storage-exchange station, a second portion of identification information by (i) replacing the second portion of the identification information by a universal identifier; or (ii) erasing the second portion of the identification information.

Figure 7:
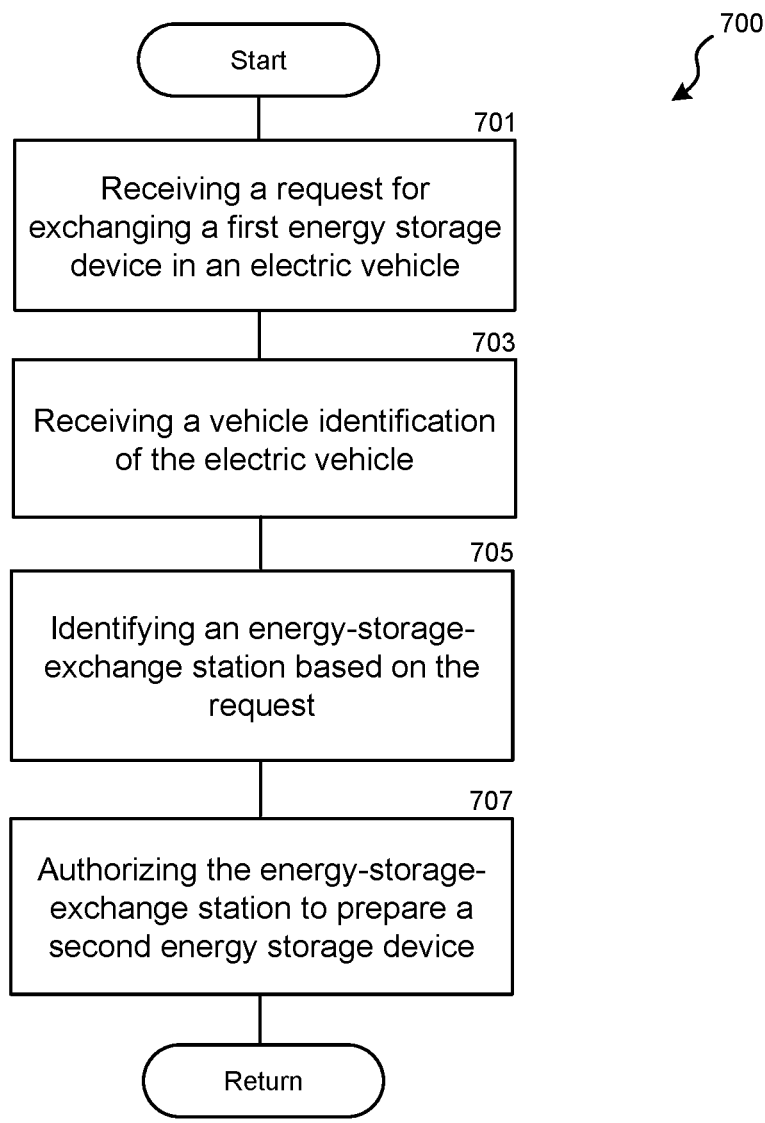

FIG. 7 is a flowchart illustrating a method 700 in accordance with embodiments of the disclosed technology. The method 700 is for managing an energy-storage-exchange station. The method 700 starts at block 701 by receiving a request for exchanging a first energy storage device in an electric vehicle.

At block 703, the method 700 continues by receiving a vehicle identification of the electric vehicle. At block 705, the method 700 incudes identifying an energy-storage-exchange station based on the request. At block 707, the method 500 continues by authorizing the energy-storage-exchange station to prepare a second energy storage device.

In some embodiment, the second energy storage device can be prepared by (i) storing part of the vehicle identification in a first portion of identification of the second energy storage device in a data storage attached to the second energy storage device; and (ii) storing a universal identifier corresponds to the vehicle identification of the electric vehicle in a second portion of the identification information of the second energy storage device in the data storage attached to the second energy storage device.

In some embodiment, the method 700 further includes receiving a signal to confirm that a unique serial number of the electric vehicle has been stored in the second portion of the identification information of the second energy storage device in the data storage attached to the second energy storage device.

In the embodiments discussed herein, a "component" can include a processor, control logic, a digital signal processor, a computing unit, and/or any other suitable device that is either configured or is programmed to execute instructions to perform the functionality described above.

In some embodiments, one or more energy-storage-exchange stations can be designated to constantly operate under the "milk run" mode. For example, such stations can locate at or be close to a service or maintenance center for service crews. In some embodiments, the present technology enables a user (who is not a service crew) to pick up energy storage devices under the "milk run" mode. For example, once authorized, the user can pick up an energy storage device at a station without inserting one to "rescue" a vehicle away from the station. In some embodiments, multiple users can be included in a user group (e.g., friends, family members, persons in a trip, etc.), and the present technology can authorize the users in the user group to pick up energy storage devices for other users under the "milk run" mode.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A method for authenticating an energy storage device, comprising:
    receiving a first portion of identification information stored in a data storage attached to the energy storage device in an event that the energy storage device is connected to an electric vehicle having a vehicle identification,
        wherein the energy storage device is configured to power the electric vehicle only in an event that the vehicle identification matches the first portion of the identification information;
    analyzing the first portion of the identification information at least partially based on the vehicle identification; and
    updating a second portion of the identification information stored in the data storage attached to the energy storage device with a unique serial number of the vehicle identification in an event that the first portion of the identification information at least partially matches the vehicle identification.

2. The method of claim 1, wherein the energy storage device is retrieved from an energy-storage-exchange station, and wherein the energy-storage-exchange station is configured to update the identification information stored in the data storage attached to the energy storage device in response to a request.

3. The method of claim 2, wherein updating the identification information includes replacing, by the energy-storage-exchange station, the second portion of the identification information with a universal identifier and updating, by the energy-storage-exchange station, the first portion of the identification information based on the request.

4. The method of claim 2, wherein updating the identification information includes erasing, by the energy-storage-exchange station, the second portion of the identification information and updating, by the energy-storage-exchange station, the first portion of the identification information based on the request.

5. The method of claim 2, wherein the request is sent from a portable device associated with the electric vehicle.

6. The method of claim 2, wherein the request is received by the energy-storage-exchange station from a user input.

7. The method of claim 2,
    wherein the request is sent from the electric vehicle.

8. The method of claim 2, wherein the request is sent from a server, wherein the server is configured to communicate with a plurality of energy-storage-exchange stations including the energy-storage-exchange station.

9. The method of claim 1, wherein the first portion of the identification information includes a prefix, and wherein the prefix corresponds to a first portion of the vehicle identification of the electric vehicle.

10. The method of claim 9, wherein the prefix corresponds to a group of energy consuming devices which the electric vehicle belongs to.

11. The method of claim 1, wherein updating the second portion of the identification information includes updating, by the electric vehicle, a unique serial number corresponding to the vehicle identification of the electric vehicle.

12. The method of claim 1, wherein the second portion of the identification information includes a universal identifier or a unique serial number.

13. The method of claim 12, wherein in an event that the second portion of the identification information includes the unique serial number of the electric vehicle, the electric energy storage device is authorized to be charged in an energy-storage-exchange station when the energy-storage-exchange station is operating under a first operational mode.

14. The method of claim 13, wherein in an event that the second portion of the identification information includes the universal identifier of the electric vehicle, the electric energy storage device is not authorized to be charged in the energy-storage-exchange station when the energy-storage-exchange station is operating under the first operational mode.

15. The method of claim 14, wherein, when the energy-storage-exchange station is operating under a second operational mode, the energy-storage-exchange station is configured to update the second portion of the identification information by replacing the second portion of the identification information with the universal identifier.

16. The method of claim 14, wherein, when the energy-storage-exchange station is operating under a second operational mode, the energy-storage-exchange station is configured to update the second portion of the identification information by erasing the second portion of the identification information.

17. A method for operating an electric vehicle, comprising:
    receiving, by a processor of the electric vehicle, a first portion of identification information stored in a data storage attached to an energy storage device in an event that the energy storage device is connected to the electric vehicle having a vehicle identification, wherein the energy storage device is configured to power the electric vehicle only when the vehicle identification matches the first portion of the identification information;
    receiving, by the processor of the electric vehicle, a vehicle identification of the electric vehicle;
    comparing the first portion of the identification information with the vehicle identification of the electric vehicle;
    updating, by the processor of the electric vehicle, a second portion of the identification information stored in the data storage attached to the energy storage device with a unique serial number of the device identification in an event that the first portion of the identification information at least partially matches the vehicle identification; and
    enabling, by the processor of the electric vehicle, the energy storage device to power the electric vehicle when the second portion of the identification information matches the unique serial number of the vehicle identification.

18. The method of claim 17, further comprising:
transmitting a signal to a server in an event that the first portion of the identification information does not match the vehicle identification.

19. The method of claim 17, wherein the first portion of the identification information includes a prefix, and wherein the prefix corresponds to the vehicle identification of the electric vehicle.

20. The method of claim 19, wherein the prefix corresponds to a group of electric vehicles which the electric vehicle belongs to.

21. A method for operating an energy-storage-exchange station, comprising:
changing, by a processor of the energy-storage-exchange station, an operational mode of the energy-storage-exchange station from a first operational mode to a second operational mode in response to a request;
updating, by the processor of the energy-storage-exchange station, a first portion and a second portion of identification information stored in a data storage attached to an energy storage device in the energy-storage-exchange station, wherein the first portion of the identification information corresponds to a device identification of an energy consuming device, wherein the second portion updated by the energy-storage-exchange station includes a universal identifier, wherein the second portion updated by the energy-storage-exchange station does not include a unique serial number of the energy consuming device, wherein the energy storage device is configured to power the energy consuming device only in an event that the energy storage device is connected to the energy consuming device having a device identification that matches the first portion of the identification information, and wherein the second portion of the identification information of the energy storage device is configured to be updated to include the unique serial number only in an event that the energy storage device is connected to the energy consuming device having the device identification that matches the first portion of the identification information;
enabling the energy storage device to be removed from the energy-storage-exchange station; and
changing the operational mode of the energy-storage-exchange station from the second operational mode to the first operational mode.

22. The method of claim 21, wherein the first portion of the identification information includes a prefix, and wherein the energy consuming device is an electric vehicle, and wherein the prefix corresponds to a group of electric vehicles which the electric vehicle belongs to.

23. The method of claim 21, further comprising updating by the processor of the energy-storage-exchange station, the second portion of identification information by replacing the second portion of the identification information with the universal identifier.

24. The method of claim 21, further comprising updating by the processor of the energy-storage-exchange station, the second portion of identification information by erasing the second portion of the identification information.

25. The method of claim 21, wherein in an event that the second portion of the identification information includes the unique serial number of the energy consuming device, the electric energy storage device is authorized to be charged in the energy-storage-exchange station when the energy-storage-exchange station is operating under the first operational mode.

26. The method of claim 21, wherein in an event that the second portion of the identification information includes the universal identifier of the electric vehicle, the electric energy storage device is not authorized to be charged in the energy-storage-exchange station when the energy-storage-exchange station is operating under the first operational mode.

27. A method for managing an energy-storage-exchange station, comprising:
receiving a request for exchanging a first energy storage device in an electric vehicle;
receiving a vehicle identification of the electric vehicle;
identifying the energy-storage-exchange station based on the request; and
authorizing the energy-storage-exchange station to prepare a second energy storage device by:
storing part of the vehicle identification in a first portion of identification information of the second energy storage device in a data storage attached to the second energy storage device; and
storing a universal identifier corresponds to the vehicle identification of the electric vehicle in a second portion of the identification information of the second energy storage device in the data storage attached to the second energy storage device,
wherein the first energy storage device is configured to only power the electric vehicle in an event that the vehicle identification matches the first portion and the second portion of the identification information, and
wherein the second energy storage device is configured to update the universal identifier to a unique serial number of the vehicle identification of the electric vehicle to be authorized to power the electric vehicle in an event that the second energy storage device is connected to the electric vehicle and the vehicle identification at least partially matches the first portion of the identification information.

* * * * *